United States Patent
Uehara

(10) Patent No.: US 7,388,623 B2
(45) Date of Patent: Jun. 17, 2008

(54) LIQUID CRYSTAL DISPLAY DEVICE AND INSPECTION METHOD

(75) Inventor: Takuya Uehara, Osaka (JP)

(73) Assignee: Funai Electric Co., Ltd., Daito-Shi (JP)

(*) Notice: Subject to any disclaimer, the term of this patent is extended or adjusted under 35 U.S.C. 154(b) by 551 days.

(21) Appl. No.: 11/166,054

(22) Filed: Jun. 24, 2005

(65) Prior Publication Data

US 2006/0001781 A1 Jan. 5, 2006

(30) Foreign Application Priority Data

Jun. 25, 2004 (JP) .................. P2004-188647

(51) Int. Cl.
*H04N 17/00* (2006.01)
*H04N 3/14* (2006.01)

(52) U.S. Cl. .................. 348/790; 348/189; 348/569

(58) Field of Classification Search ............... 348/790, 348/553–555, 563, 564, 567, 569, 589, 189; 345/141, 192–194, 213, 467–472; 725/37–61, 725/142; *H04N 17/00, 3/14*
See application file for complete search history.

(56) References Cited

U.S. PATENT DOCUMENTS

| | | | | |
|---|---|---|---|---|
| 5,623,316 A * | 4/1997 | Naito et al. | ................. | 348/569 |
| 5,929,928 A * | 7/1999 | Matsugami et al. | ........ | 348/563 |
| 6,657,626 B1 * | 12/2003 | Shintoku | .................... | 345/467 |
| 6,670,956 B2 * | 12/2003 | Yoo et al. | .................... | 345/471 |
| 7,047,552 B2 * | 5/2006 | Chung et al. | ................ | 725/142 |

FOREIGN PATENT DOCUMENTS

JP 11-6987 1/1999

OTHER PUBLICATIONS

Patent Abstracts of Japan; Publication No. 11-006987 dated Jan. 12, 1999 (2 pages).

* cited by examiner

*Primary Examiner*—Trang U. Tran
(74) *Attorney, Agent, or Firm*—Osha Liang LLP

(57) ABSTRACT

An OSD display unit generates test pattern data to spread image patterns stored in a storage unit as digital font data for OSD display so as to match the number of pixels of a liquid crystal panel and sends the test pattern data to a panel processor for display on the liquid crystal panel.

2 Claims, 6 Drawing Sheets

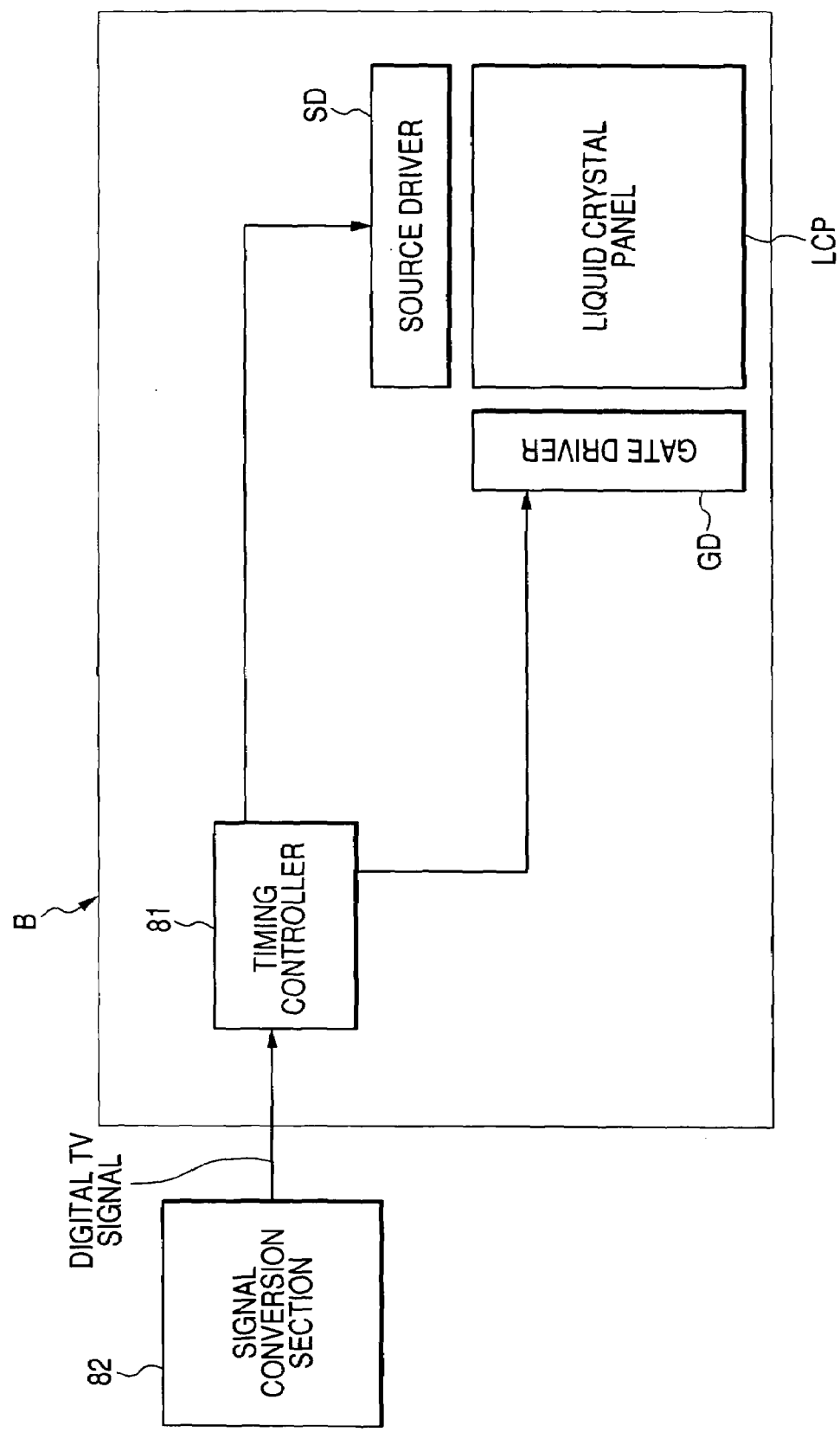

LIQUID CRYSTAL DISPLAY DEVICE AND INSPECTION METHOD

BACKGROUND OF THE INVENTION

1. Field of the Invention

The present invention relates to an inspection method of an image displayed on a liquid crystal display for a TV, a liquid crystal display, a liquid crystal module, and an IC having the inspection method and in particular to those using OSD display unit.

2. Description of the Related Art

In recent years, a large number of TVs using a liquid crystal display as a display of a TV receiver have hit the consumer market. The TV liquid crystal display has a liquid crystal module. FIG. 5 is a schematic layout drawing of a liquid crystal module in a related art.

A liquid crystal module B shown in FIG. 5 has a timing controller 81, a liquid crystal panel LCP, a source driver SD for controlling the voltage of a source electrode attached to the liquid crystal panel LCP, and a gate driver GD for controlling the voltage of a gate electrode.

An external digital signal is input to the liquid crystal module B and is converted into a liquid crystal drive signal of the source driver SD and the gate driver GD in a timing controller 81 and the liquid crystal drive signal is input to the source driver SD and the gate driver GD for producing display on the liquid crystal panel LCP.

Broadcast signals of terrestrial TV broadcasts and satellite broadcasts are analog, and a signal conversion section 82 for converting the analog broadcast signal (composite signal, component signal, etc.,) into a digital signal for display in the liquid crystal module B is provided outside the liquid crystal module B.

In the configuration, the liquid crystal display requires the signal conversion section 82 in addition to the liquid crystal module B and the number of components increases. Then, a one-chip IC containing the timing controller 81 and the signal conversion section is proposed. FIG. 6 is a schematic layout drawing of a liquid crystal module having the one-chip IC.

A liquid crystal module C shown in FIG. 6 has the same liquid crystal panel, source driver, and gate driver as the liquid crystal module B shown in FIG. 5, denoted by the same reference numerals. The liquid crystal module C has a one-chip IC having a video processor 91 for converting an external input broadcast signal into a video signal, a scaling processor 92 for changing the video size, system, etc., a panel processor 93 for adjusting the video brightness, tint, etc., so as to match the display state of the liquid crystal panel LCP, and a timing controller 94 for converting the video signal into a drive timing signal for liquid crystal drive to be sent to the source driver SD and the gate driver GD and outputting the drive timing signal.

The video processor 91 includes a conversion section for converting an analog signal into a digital signal (not shown) and converts an external input signal into a digital signal and then converts the digital signal into a video signal. Thus, an analog broadcast signal can be input directly to the liquid crystal module C; the need for providing an external signal conversion section as in the liquid crystal module B shown in FIG. 5 is eliminated and the number of components can be suppressed and the structure can be simplified accordingly.

One example of a conventional liquid crystal module as described above is disclosed in JP-A-11-006987.

SUMMARY OF THE INVENTION

However, to use the liquid crystal module C, an external test pattern signal generator 95 for generating a test pattern signal must be connected for inspecting the liquid crystal module C. The test pattern signal generator 95 outputs only the test pattern signal used only to inspect the liquid crystal module C and the efficiency is poor.

At this time, the test pattern signal input from the test pattern signal generator 95 to the liquid crystal module C is an analog signal, which involves the following problems as compared with a digital signal:

(1) Display is not clear as compared with a digital signal.

(2) Analog noise easily occurs on a screen.

(3) Since gradation display is not precise, trouble in specific gradation of source driver may be unfound.

(4) Severe flicker cannot be adjusted.

(5) A display pattern in subpixel units cannot be generated.

(6) Precise characteristic measurement of liquid display section cannot be conducted.

It is therefore one of objects of the invention to provide a liquid crystal display for TV display, a liquid crystal module, an IC, and an inspection method of a liquid crystal display for TV display for making it possible to conduct fine liquid crystal panel display inspection by using a digital video signal.

According to a first aspect of the invention, there is provided a liquid crystal display device for television, which an analog video signal is directly input, the liquid crystal display device including: a liquid crystal panel that displays video image, the liquid crystal panel having source electrodes and gate electrodes; a source driver that outputs signals to the source electrodes; a gate driver that outputs signals to the gate electrode; a storage unit that stores various pieces of information; and an IC chip that includes: a video processor that converts the analog video signal into a digital video signal; a scaling processor that converts the display size and display format of the digital video signal provided by the video processor; a panel processor that adjusts the digital video signal provided by the scaling processor to match characteristic of the liquid crystal panel; a timing controller that generates and outputs a drive timing signal for the source driver and the gate driver based on the video signal adjusted by the panel processor; an OSD display unit that generates video data different from video data included in the analog video signal; and a microcomputer that controls each of the components included in the IC chip, wherein the storage unit stores an image pattern as digital font data for displaying OSD image, and a predetermined image pattern different from the image pattern as digital font data, and wherein when inspecting display performance of the liquid crystal display device, the OSD display unit generates test pattern data by arranging the predetermined image pattern stored in the storage unit in a predetermined order so as to match the size of the liquid crystal panel, and outputs the test pattern data to the panel processor as digital video signal for displaying on the liquid crystal panel.

According to a second aspect of the invention, there is provided an inspection method for inspecting display performance of a liquid crystal display device for television, which an analog video signal is directly input therein, the inspection method including: converting an analog video signal into a digital video signal; converting display size and display format of the digital video signal converted from the analog video signal; adjusting the digital video signal, in which the display size and display format is converted, to match characteristic of a liquid crystal panel; generating a drive timing signal of the liquid crystal panel based on the adjusted video signal; outputting the drive timing signal; generating video data different from video data converted from the analog video signal; generating a test pattern data by arranging a predetermined image pattern stored in a storage unit in a predetermined order so as to match the size of a liquid crystal panel; and outputting the test pattern data as digital video signal for displaying on the liquid crystal panel.

BRIEF DESCRIPTION OF THE DRAWINGS

The above objects and advantages of the present invention will become more apparent by describing preferred exemplary embodiments thereof in detail with reference to the accompanying drawings, wherein:

FIG. 5 is a schematic layout drawing of an example of a liquid crystal module in a related art.

DETAILED DESCRIPTION OF THE PREFERRED EMBODIMENTS

Figure 1:
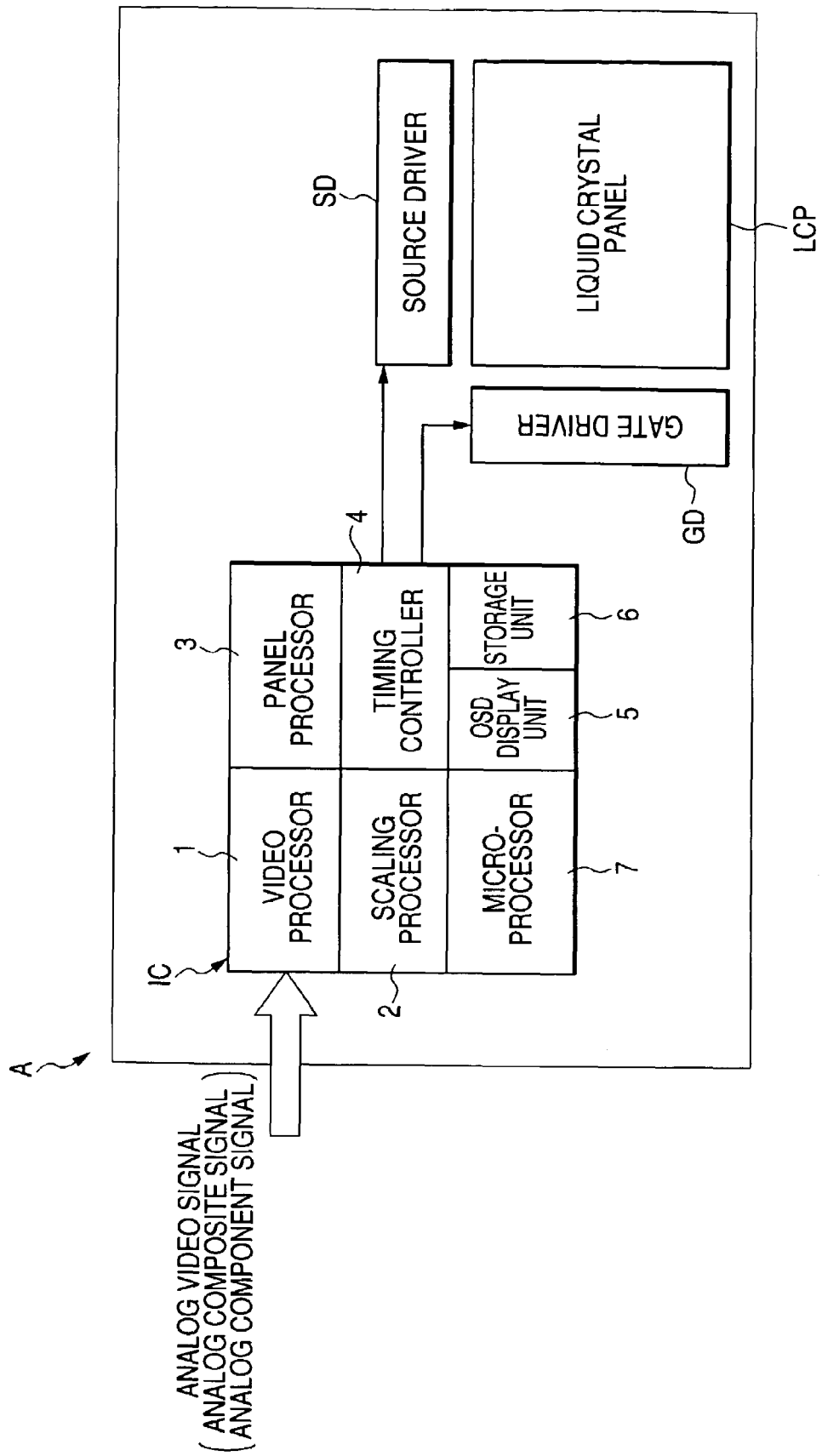
FIG. 1 is a schematic layout drawing of an example of a liquid crystal module according to the invention.

The best mode for carrying out the invention will be discussed with reference to the accompanying drawings. FIG. 1 is a schematic layout drawing of a liquid crystal module used with a liquid crystal display for TV display according to the invention. A liquid crystal module A shown in FIG. 1 has an IC having a video processor 1, a scaling processor 2, a panel processor 3, a timing controller 4, an OSD display unit 5, a storage unit 6, and a microcomputer 7 for controlling the components and the sections, a liquid crystal panel LCP, a gate driver GD, and a source driver SD.

The liquid crystal panel LCP has a gate electrode and a source electrode (not shown), which are driven based on a signal from the gate driver GD and a signal from the source driver SD respectively. The gate electrode and the source electrode can apply voltage for each liquid crystal pixel and as a predetermined voltage is applied between the gate electrode and the source electrode, an image is displayed on the liquid crystal panel LCP.

Figure 2:
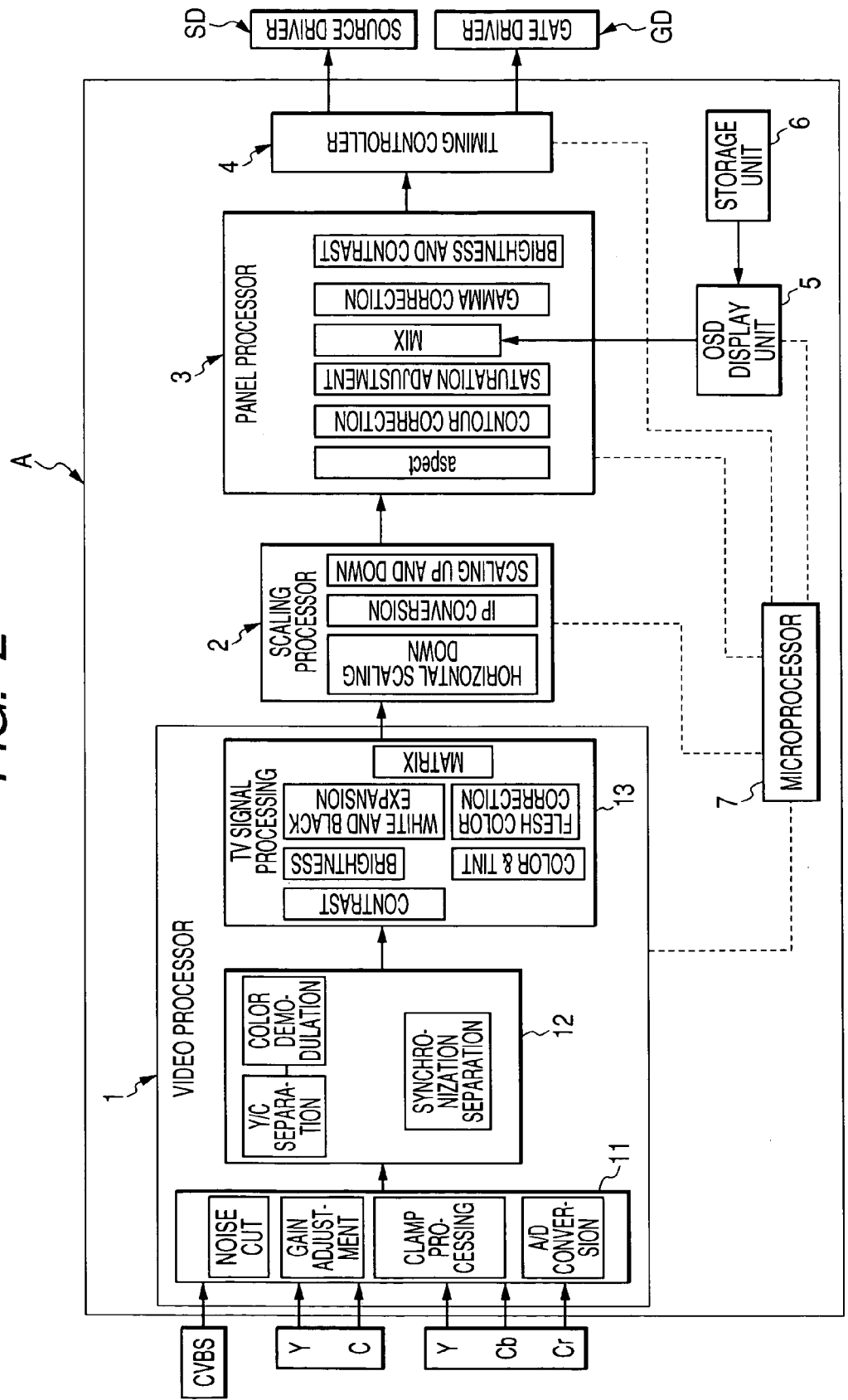
FIG. 2 is a schematic layout drawing of an IC according to the invention.

FIG. 2 is a schematic layout drawing of the IC used with the liquid crystal module shown in FIG. 1. The IC shown in FIG. 2 includes the video processor 1, the scaling processor 2, the panel processor 3, the timing controller 4, the OSD display unit 5, the storage unit 6, and the microcomputer 7. The microcomputer 7 controls the video processor 1, the scaling processor 2, the panel processor 3, the timing controller 4, the OSD display unit 5, and the storage unit 6.

The video processor 1 has a digital conversion section 11 for performing clamp processing, noise cut, gain adjustment, etc., of an external received analog video signal (for example, analog composite signal CVBS, Y/C, analog component signal Y/Cb/Cr, etc.,) and then converting the signal into a digital video signal, a signal processing section 12 for separating brightness information (Y) and color information (C) of the digital video signal provided by the digital conversion section 11, demodulating color data based on the color information, and synchronizing, separating component information contained in the digital video signal for conversion to a digital TV signal, and a TV signal processing section 13 for performing contrast, brightness, and color & tint adjustment and black-and-white expansion and flesh color correction of the digital TV signal output by the signal processing section 12 as required and converting the signal into a digital video signal like matrix data.

The scaling processor 2 performs horizontal scaling-down, scaling-up and down, and progressive conversion of the digital video signal output by the video processor 1 as required. The panel processor 3 converts the digital video signal provided by the scaling processor 2 so as to match the characteristic of the liquid crystal panel LCP of a display section; it performs aspect ratio change, image contour correction, saturation adjustment, gamma correction, and brightness and contrast adjustment as required. The panel processor 3 also performs mix operation of mixing a digital video signal from the OSD display unit 5 described later with the digital video signal from the scaling processor 2.

The timing controller 4 generates and outputs a drive timing signal to drive the gate driver GD and the source driver SD for driving the liquid crystal panel LCP based on the digital video signal adjusted matching the characteristic of the liquid crystal panel LCP in the panel processor 3.

The OSD display unit 5 is connected to the panel processor 3 for displaying information of the volume, TV reception channel, time, etc., for example, on the liquid crystal panel LCP using font data stored in the storage unit 6. The display on the liquid crystal panel LCP by the OSD display unit 5 is superposed on the video of the digital video signal input to the panel processor 3 by the scaling processor 2. When the digital video signal is not input to the panel processor 3, only the display of the OSD display unit 5 is produced on the liquid crystal panel LCP.

Figure 3:
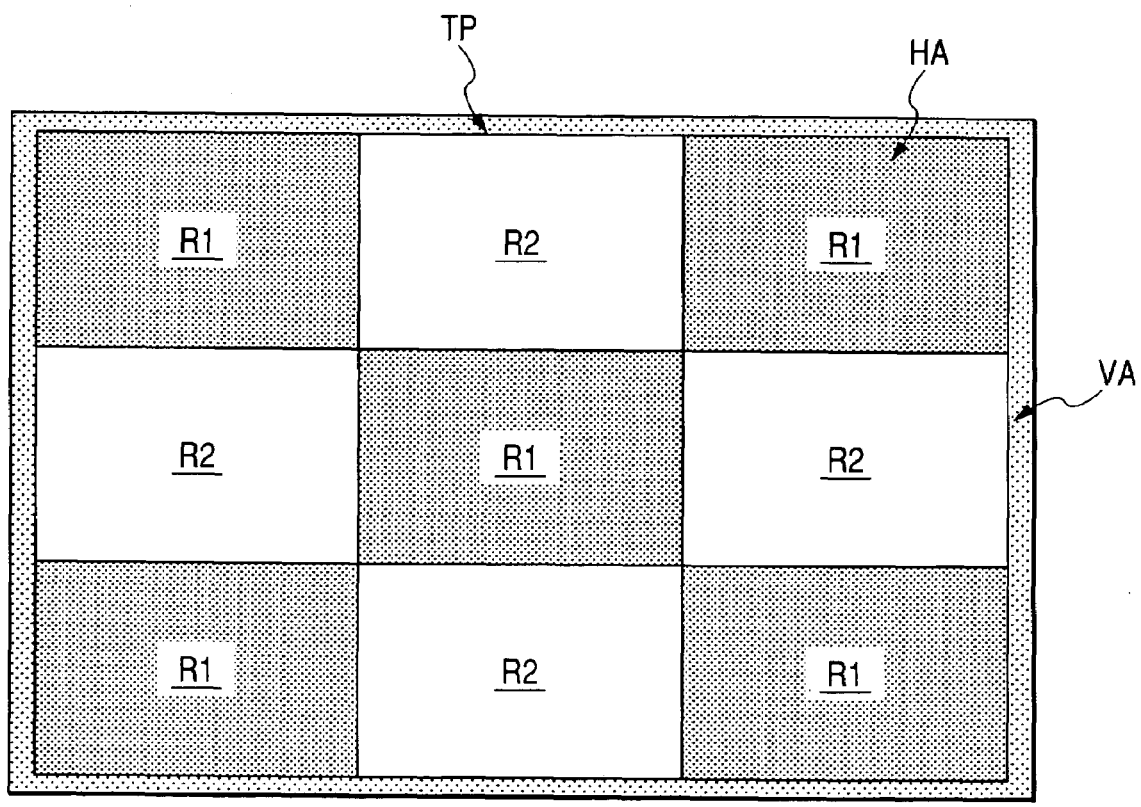
FIG. 3 shows a test pattern used with a liquid crystal display inspection method according to the invention.
Figure 4B:
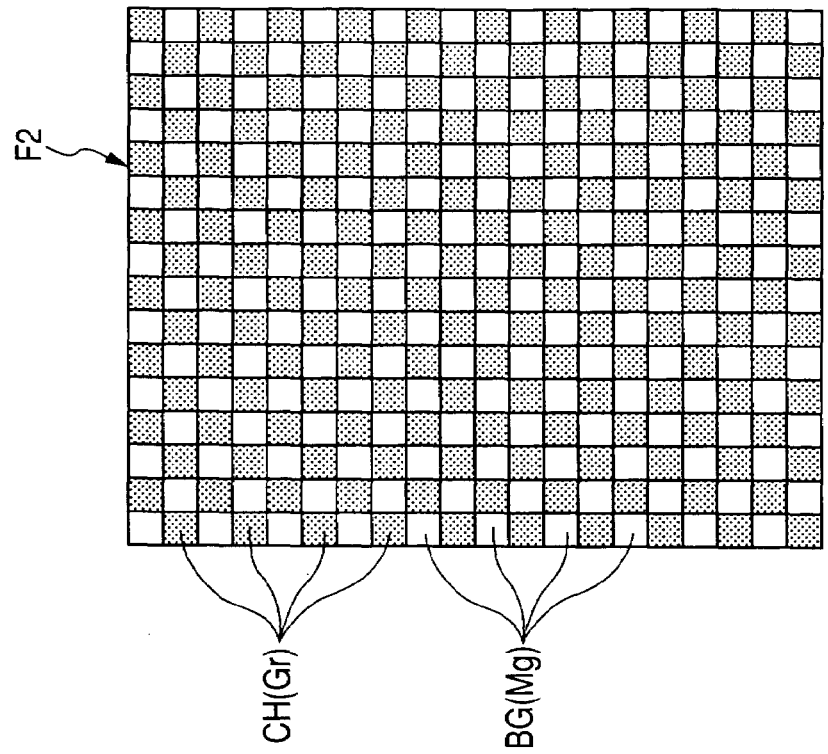
FIGS. 4A and 4B show first font and second font forming the test pattern shown in FIG. 3.
Figure 4A:
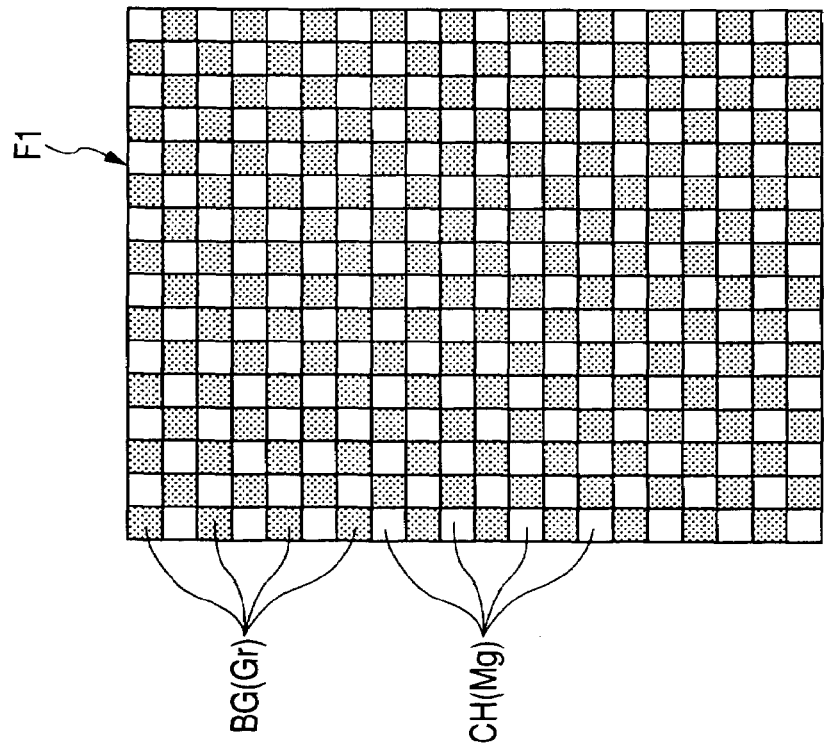
Figure 6:
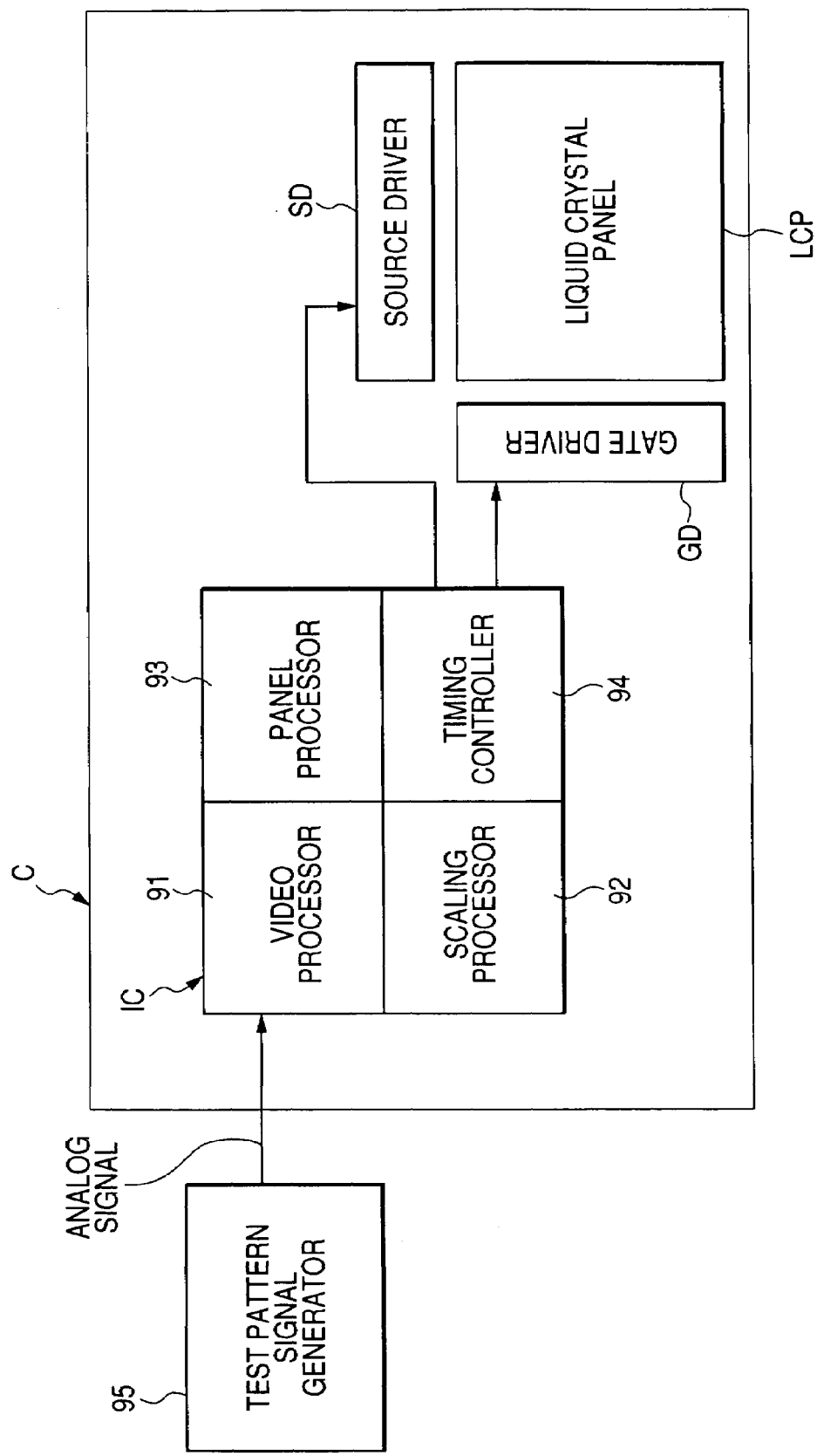
FIG. 6 is a schematic layout drawing of an example of a liquid crystal module in a related art.

The OSD display unit 5 generates test pattern data to spread the image patterns stored in the storage unit 6 as digital font data for OSD display so as to match the number of pixels of the liquid crystal panel LCP. FIG. 3 shows an example of a test pattern displayed on the liquid crystal panel. FIGS. 4A and 4B are enlarged views of digital font used to display the test pattern shown in FIG. 3.

Test pattern TP shown in FIG. 3 is a test pattern for flicker adjustment. Flicker may occur depending on the color arrangement on the liquid crystal panel LCP. As shown in FIG. 3, a display face of the liquid crystal panel LCP has a display area HA and a viewing area VA. The display area HA is divided into nine regions of 3×3 and adjacent regions are covered with different patterns of the test pattern TP shown in FIG. 3. Here, by way of example, the regions placed in the four corners and the center are first regions R1 and other regions are second regions R2.

As shown in FIGS. 4A and 4B, the digital font is 16×20 dots and two types of fonts (first font F1 and second font F2) are provided. Each of the two types of fonts F1 and F2 is an alternating dot pattern of two colors. Here, by way of example, two colors of green Gr (RGB: 0, 47, 0) and magenta Mg (RGB: 47, 0, 47) are used for each font.

As shown in FIGS. 4A and 4B, the font is separated into background BG and text CH; in the first font F1, the background BG is green Gr and the text CH is magenta Mg (see FIG. 4A) and in the second font F2, the background BG is magenta Mg and the text CH is green Gr (see FIG. 4B). The first regions R1 shown in FIG. 3 are covered with the first font F1 and the second regions R2 are covered with the second font F2, whereby the test pattern TP for flicker inspection is formed. As the test pattern TP is displayed on the liquid crystal panel LCP, flicker inspection can be conducted.

The test pattern TP for flicker inspection and the font data F1 and F2 shown in FIGS. 3 and 4 are alternating dot patterns of green Gr and magenta Mg. If the test pattern TP is formed as analog video data and is sent to the liquid crystal module A, mix color of the component colors (here, green Gr and magenta Mg) rather than an image with the different colors placed for each dot is produced because of the characteristic of analog data, and it is impossible to display a flicker test pattern.

For digital data, color is specified for each dot and the data is input directly to the panel processor 3 as a digital signal. The panel processor 3 adjusts the digital signal so as to match the characteristic of the liquid crystal panel LCP and then sends the adjusted digital signal to the timing controller 4, so that the test pattern can be displayed in a state in which image disorder does not exist.

The digital signal is hard to receive the effect of noise and is not attenuated, so that clear display can be produced. Since precise color can be displayed in dot units, precise gradation display is possible and accordingly it is also easy to find trouble of the source driver SD.

In the embodiment described above, the digital font data stored in the storage unit 6 is made up of 16×20 dots, but the invention is not limited to it; the digital font data may be larger than or smaller than the size. Preferably, as the size of the digital font data, the display area of the liquid crystal panel can be covered with the digital font data neither too much nor too less. The test pattern TP is divided into nine regions by way of example, but the invention is not limited to it; the test pattern TP may be divided appropriately for the inspection method.

In the description of the embodiment, the inspection method according to the invention is used for flicker inspection by way of example, but the invention is not limited to it. Display of one color of red, green, or blue of the primary color of the liquid crystal panel LCP, gradation display, gray scale display, etc., can be widely adopted if display can be produced in dot units. In addition to flicker, image data can be formed in dot units, so that finer inspection can be conducted. Display as described above is produced, whereby all inspections of the liquid crystal module A for trouble of pixels of the liquid crystal panel LCP, trouble in specific gradation of the source driver SD, checking a degraded point, checking a bright point, color shading, etc.

In addition to the digital font previously stored in the storage unit 6, the image data crated by the user (inspector) as required according to the inspection method can also be stored in the storage unit 6 as digital font data, and can be placed as desired together with the image data stored in the storage unit 6 to create a test pattern.

In the description of the embodiment, the liquid crystal display and the liquid crystal module using the liquid crystal panel are taken as an example of the image display section, but the invention is not limited to it. The inspection method can be adopted widely for image displays adopting the matrix system (plasma display, EL display, etc.,).

As described with reference to the embodiment, there is provided a TV liquid crystal display including a liquid crystal module to which an analog video signal can be directly input, characterized in that the liquid crystal module includes a liquid crystal panel for displaying video; a source driver for controlling a source electrode attached to the liquid crystal panel; a gate driver for controlling a gate electrode attached to the liquid crystal panel; a video processor for converting an analog video signal into a digital video signal; a scaling processor for converting the display size and display format of the digital video signal provided by the video processor; a panel processor for adjusting the digital video signal provided by the scaling processor so as to match the characteristic of the liquid crystal panel; a timing controller for generating and outputting a drive timing signal of the source driver and the gate driver based on the video signal adjusted by the panel processor; an OSD display unit for generating video data different from video data based on the external input video signal; and a storage unit for storing various pieces of information, that the video processor, the scaling processor, the panel processor, the timing controller, the OSD display unit, and the storage unit are contained in one IC and this IC includes a microcomputer for controlling the components contained in the IC, that an image pattern is stored in the storage unit as digital font data for OSD display and any desired image pattern can also be stored in the storage unit as digital font data, and that at the display inspection time of the liquid crystal module, the OSD display unit generates test pattern data arranging the image patterns stored in the storage unit in a predetermined order so as to match the size of the liquid crystal panel, and sends the test pattern data to the panel processor as digital video signal, whereby the test pattern is displayed on the liquid crystal panel.

According to the configuration, in the liquid crystal display, the external video signal input is an analog video signal and the signal of the test pattern data to inspect the liquid crystal module is originated as an internal digital signal for display on the liquid crystal panel.

Thus, the liquid crystal display can display the test pattern sharply so as to lessen the effect of noise. Precise gradation can also be displayed. Further, to produce display for flicker inspection, severe flicker display is also possible and fine adjustment is possible accordingly. Since the display system characteristic of liquid crystal is matched, precise characteristic measurement of the liquid crystal panel is possible.

Since a signal converter for converting an analog video signal into a digital video signal is not required outside the liquid crystal module, fruitless apparatus and wiring can be decreased, so that the structure can be simplified and manufacturing is also simplified. The manufacturing cost can be reduced accordingly.

As described with reference to the embodiment, there is provided an IC including a video processor for converting an analog video signal into a digital video signal; a scaling processor for converting the display size and display format of the digital video signal provided by the video processor; a panel processor for adjusting the digital video signal provided by the scaling processor so as to match the characteristic of a liquid crystal panel; a timing controller for generating and outputting a matrix drive timing signal based on the video signal adjusted by the panel processor; an OSD display unit for displaying video different from video based on the external input video signal; a storage unit for storing various pieces of information; and a microcomputer for controlling the components, characterized in that the video processor, the scaling processor, the panel processor, the timing controller, the OSD display unit, and the storage unit are contained in one IC and this IC includes a microcomputer for controlling the components contained in the IC, that an image pattern is stored in the storage unit as digital font data for OSD display and any desired image pattern can also be stored in the storage unit as digital font data, and that at the display inspection time of the liquid crystal module, the OSD display unit arranges the image patterns stored in the storage unit in a predetermined order to create test pattern data, and sends the test pattern data to the panel processor as digital video signal, and the timing controller outputs the drive timing signal.

According to the configuration, the external video signal input is an analog video signal and the signal of the test pattern data to inspect the liquid crystal module is originated as an internal digital signal. Since the external input video signal is an analog signal and the test pattern uses a digital signal, display inspection can be conducted accurately.

The signal output from the IC is image data of a matrix system and the IC can also be used as a module IC of an image display adopting the matrix system (plasma display, EL display, etc.,).

As described with reference to the embodiment, there is provided a liquid crystal module to which an analog video signal can be directly input, the liquid crystal module including a liquid crystal panel for displaying video; a source driver for controlling a source electrode attached to the liquid crystal panel; a gate driver for controlling a gate electrode attached to the liquid crystal panel; a video processor for converting an analog video signal into a digital video signal; a scaling processor for converting the display size and display format of the digital video signal provided by the video processor; a panel processor for adjusting the digital video signal provided by the scaling processor so as to match the characteristic of the liquid crystal panel; a timing controller for generating and outputting a drive timing signal of the source driver and the gate driver based on the video signal adjusted by the panel processor; an OSD display unit for generating video data different from video data based on the external input video signal; and a storage unit for storing various pieces of information, characterized in that the video processor, the scaling processor, the panel processor, the timing controller, the OSD display unit, and the storage unit are contained in one IC and this IC includes a microcomputer for controlling the components of the IC, that an image pattern is stored in the storage unit as digital font data and any desired image pattern can also be stored in the storage unit as digital font data, and that at the display inspection time of the liquid crystal module, the OSD display unit arranges the image patterns stored in the storage unit in a predetermined order so as to match the size of the liquid crystal panel to create test pattern data, and sends the test pattern data to the panel processor as digital video signal, whereby the test pattern is displayed on the liquid crystal panel.

According to the configuration, the external video signal input is an analog video signal and the signal of the test pattern data to inspect the liquid crystal module is originated as an internal digital signal. Since the external input video signal is an analog signal and the test pattern uses a digital signal, an external signal converter is not required and inspection can be conducted accurately.

Accordingly, display inspection of the liquid crystal module and the liquid crystal panel can be conducted without installing the liquid crystal module in the liquid crystal display, so that the inspection costs can be reduced.

As described with reference to the embodiment, there is provided an inspection method of a liquid crystal display including a liquid crystal module to which an analog video signal can be directly input, the inspection method including a video conversion step of converting an analog video signal into a digital video signal; a size conversion step of converting the display size and display format of the digital video signal provided in the video conversion step; a video adjustment step of adjusting the digital video signal provided in the size conversion step so as to match the characteristic of a liquid crystal panel; a signal synchronizing step of generating and outputting a drive timing signal of the liquid crystal panel based on the video signal adjusted in the video adjustment step; and an OSD display step of generating video data different from video data based on the external input video signal, characterized in that at the display inspection time of the liquid crystal module, the OSD display step is to create a test pattern arranging image patterns stored in a storage unit in a predetermined order so as to match the size of the liquid crystal panel as digital video signal, and that in the video adjustment step, the digital video signal is adjusted so as to match the characteristic of the liquid crystal panel and in the signal synchronizing step, the drive timing signal of the liquid crystal panel is generated and output, whereby the test pattern is displayed on the liquid crystal panel.

According to the configuration, the external video signal input is an analog video signal and the signal of the test pattern data to inspect the liquid crystal module is originated as an internal digital signal. Since the external input video signal is an analog signal and the test pattern uses a digital signal, display inspection of the liquid crystal module and the liquid crystal panel can be conducted accurately.

According to the embodiment, there can be provided the liquid crystal display for TV display, the liquid crystal module, the IC, and the inspection method of a liquid crystal display for TV display for making it possible to internally generate digital inspection display data for use as a digital video signal and accordingly conduct finer liquid crystal panel display inspection.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A liquid crystal display device for television, which an analog video signal is directly input, the liquid crystal display device comprising:

a liquid crystal panel that displays video image, the liquid crystal panel having source electrodes and gate electrodes;

a source driver that outputs signals to the source electrodes;

a gate driver that outputs signals to the gate electrode;

a storage unit that stores various pieces of information; and an IC chip that includes:

a video processor that converts the analog video signal into a digital video signal;

a scaling processor that converts the display size and display format of the digital video signal provided by the video processor;

a panel processor that adjusts the digital video signal provided by the scaling processor to match characteristic of the liquid crystal panel;

a timing controller that generates and outputs a drive timing signal for the source driver and the gate driver based on the video signal adjusted by the panel processor;

an OSD display unit that generates video data different from video data included in the analog video signal; and a microcomputer that controls each of the components included in the IC chip, wherein the storage unit stores an image pattern as digital font data for displaying OSD image, and a predetermined image pattern different from the image pattern as digital font data, and wherein when inspecting display performance of the liquid crystal display device, the OSD display unit generates test pattern data by arranging the predetermined image pattern stored in the storage unit in a predetermined order so as to match the size of the liquid crystal panel, and outputs the test pattern data to the panel processor as digital video signal for displaying on the liquid crystal panel.

2. An inspection method for inspecting display performance of a liquid crystal display device for television, which an analog video signal is directly input therein, the inspection method comprising:

converting an analog video signal into a digital video signal;

converting display size and display format of the digital video signal converted from the analog video signal;

adjusting the digital video signal, in which the display size and display format is converted, to match characteristic of a liquid crystal panel;

generating a drive timing signal of the liquid crystal panel based on the adjusted video signal;

outputting the drive timing signal;

generating video data different from video data converted from the analog video signal;

generating a test pattern data by arranging a predetermined image pattern stored in a storage unit in a predetermined order so as to match the size of a liquid crystal panel; and outputting the test pattern data as digital video signal for displaying on the liquid crystal panel.

* * * * *